(12) United States Patent
Stupak et al.

(10) Patent No.: US 8,970,713 B2
(45) Date of Patent: *Mar. 3, 2015

(54) AUTOMATIC ENGAGEMENT OF IMAGE STABILIZATION

(71) Applicant: Apple Inc., Cupertino, CA (US)

(72) Inventors: Noah J. Stupak, Boston, MA (US); Keith S. Kam, Narberth, PA (US); Timothy J. White, Minneapolis, MN (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,961

(22) Filed: Jan. 6, 2014

(65) Prior Publication Data

US 2014/0118566 A1    May 1, 2014

Related U.S. Application Data

(63) Continuation of application No. 12/943,328, filed on Nov. 10, 2010, now Pat. No. 8,643,734.

(51) Int. Cl.
| | | |
|---|---|---|
| *H04N 5/228* | (2006.01) | |
| *H04N 5/235* | (2006.01) | |
| *G06K 9/40* | (2006.01) | |
| *G03B 17/00* | (2006.01) | |

(Continued)

(52) U.S. Cl.
CPC .............. *H04N 5/23254* (2013.01); *G03B 5/00* (2013.01); *G03B 17/00* (2013.01); *H04N 5/23241* (2013.01); *H04N 5/23248* (2013.01); *H04N 5/2328* (2013.01); *G03B 2217/005* (2013.01)

USPC .......... 348/208.99; 348/362; 382/255; 396/55

(58) Field of Classification Search
CPC .................................................. H04N 5/23254
USPC ................. 348/208.1–208.4, 208.12, 208.14, 348/208.16, 208.99, 222.1, 333.1, 362, 371
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly |

(Continued)

OTHER PUBLICATIONS

Bruce Pillman: "Camera Exposure Determination Based on a Psychometric quality Model," Signal Processing Systems (SIPS) 2010 IEEE Workshop on, Oct. 6, 2010-Oct. 8, 2010, pp. 339-344, XP002670115, ISSN: 1520-6130 Paragraph [0005]; figure 8.

(Continued)

*Primary Examiner* — Trung Diep
(74) *Attorney, Agent, or Firm* — Wong, Cabello, Lutsch, Rutherford & Brucculeri, LLP

(57) ABSTRACT

An image stabilized digital image capture device, comprising an image sensor for capturing a digital image; an optical system for imaging a scene onto the image sensor; an image stabilization system; an exposure control system; a memory system; and a processor. The processor is used to perform the steps of determining exposure settings using the exposure control system; selectively engaging the image stabilization system responsive to whether the determined exposure settings satisfy a predefined condition; capturing a digital image of a scene using the image sensor and the selectively engaged image stabilization system; and storing the captured digital image in the memory system.

20 Claims, 5 Drawing Sheets

(51) Int. Cl.
*H04N 5/232* (2006.01)
*G03B 5/00* (2006.01)

(56) References Cited

U.S. PATENT DOCUMENTS

| | | | |
|---|---|---|---|
| 5,189,511 A | 2/1993 | Parulski | |
| 5,493,335 A | 2/1996 | Parulski | |
| 5,598,237 A | 1/1997 | McIntyre | |
| 5,652,621 A | 7/1997 | Adams, Jr. | |
| 5,668,597 A | 9/1997 | Parulski | |
| 6,091,448 A | 7/2000 | Washisu | |
| 6,192,162 B1 | 2/2001 | Hamilton, Jr. | |
| 6,292,218 B1 | 9/2001 | Parulski | |
| 6,366,735 B1 | 4/2002 | Sato | |
| 6,384,976 B1 | 5/2002 | Ishijima | |
| 6,934,056 B2 | 8/2005 | Gindele | |
| 7,164,531 B2 | 1/2007 | Yamamoto | |
| 7,358,794 B2 * | 4/2008 | Kawagoshi | 327/537 |
| 7,460,155 B2 | 12/2008 | Eto | |
| 7,542,077 B2 | 6/2009 | Miki | |
| 7,546,026 B2 | 6/2009 | Pertsel | |
| 7,697,836 B2 | 4/2010 | Pozniansky | |
| 8,063,942 B2 | 11/2011 | Hung | |
| 8,139,130 B2 | 3/2012 | Compton | |
| 8,228,400 B2 * | 7/2012 | Liu et al. | 348/239 |
| 8,558,913 B2 | 10/2013 | Pillman | |
| 2001/0033331 A1 | 10/2001 | Eto | |
| 2002/0093739 A1 | 7/2002 | Ishijima | |
| 2004/0012683 A1 | 1/2004 | Yamasaki | |
| 2005/0001906 A1 * | 1/2005 | Sato et al. | 348/208.6 |
| 2005/0264654 A1 * | 12/2005 | Eto et al. | 348/208.99 |
| 2006/0274156 A1 | 12/2006 | Rabbani | |
| 2007/0058957 A1 | 3/2007 | Hosoda | |
| 2007/0092244 A1 | 4/2007 | Pertsel | |
| 2007/0237506 A1 | 10/2007 | Minema | |
| 2007/0237514 A1 | 10/2007 | Pillman | |
| 2008/0101786 A1 | 5/2008 | Pozniansky | |
| 2009/0040364 A1 * | 2/2009 | Rubner | 348/362 |
| 2009/0087173 A1 | 4/2009 | Li | |
| 2009/0102935 A1 * | 4/2009 | Hung et al. | 348/222.1 |
| 2010/0182441 A1 | 7/2010 | Fukumoto | |
| 2010/0208087 A1 | 8/2010 | Ogawa | |
| 2011/0193990 A1 | 8/2011 | Pillman | |
| 2012/0113280 A1 | 5/2012 | Stupak | |

OTHER PUBLICATIONS

International Search Report and Written Opinion for PCT Application No. PCT/US2011/059250, dated Jan. 27, 2012, 11 Pages.
International Search Report and Writtion Opinion for PCT Application No. PCT/US2011/056872, dated Feb. 7, 2012, 12 Pages.

* cited by examiner

AUTOMATIC ENGAGEMENT OF IMAGE STABILIZATION

CROSS-REFERENCE TO RELATED APPLICATIONS

This is a continuation of U.S. patent application Ser. No. 12/943,328, by Noah J. Stupak, et al., entitled "Automatic Engagement of Image Stabilization," filed Nov. 10, 2010, which is incorporated by reference herein in its entirety.

Reference is made to commonly-assigned, U.S. patent application Ser. No. 12/943,357, by Keith S. Karn et al., entitled "Imaging System with Automatically Engaging Image Stabilization," filed Nov. 10, 2010, which is incorporated herein by reference.

FIELD OF THE INVENTION

This invention pertains to the field of digital cameras and more particularly capturing a digital image of a scene using a selectively engaged image stabilization system.

BACKGROUND OF THE INVENTION

An electronic imaging system depends on a lens system to form an image on an image sensor to create an electronic representation of a visual image. Examples of such image sensors include charge coupled device (CCD) image sensors and active pixel sensor (APS) devices. (APS devices are often referred to as CMOS sensors because of the ability to fabricate them in a Complementary Metal Oxide Semiconductor process.) A sensor includes a two-dimensional array of individual picture element sensors, or "pixels." For color imaging systems, each pixel is typically provided with either a red, green, or blue filter, as for example described by Bayer in U.S. Pat. No. 3,971,065 so that a full color image can be produced. Regardless of the type of image sensor employed (e.g., CCD or CMOS), the pixel acts as a bucket in which photo-generated charge is accumulated in direct proportion to the amount of light that strikes the pixel during the capture of an image by the electronic imaging system.

The image sensor gathers light for an interval of time called the exposure time or integration time to make a correct exposure during image capture. Based on brightness measurements of the scene, an exposure control system is used to determine a suitable exposure time that will yield an image with effective brightness and an effective signal to noise ratio. The exposure control system may also determine other settings such as a lens aperture setting and an exposure index setting. Generally, the dimmer the scene, the larger the amount of time the electronic imaging system must use to gather light to make a correct exposure.

FIG. 1 shows a flow chart of a typical exposure control system 200 for a digital camera. In assess scene brightness step 210, the camera assesses the scene brightness either with a scene brightness sensor or with an analysis of a preview image. In the typical camera control system shown in FIG. 1, motion is not measured nor taken into account. In determine capture mode step 220, a capture mode setting 225 is determined based on the measured scene brightness and any operator-selected user interface settings. In determine exposure index step 230, an exposure index setting 235 (S) is determined in accordance with the measured scene brightness and the capture mode setting 225. In determine aperture step 240, an aperture setting 245 is determined to control the F/# of the camera lens in accordance with the measured scene brightness, the capture mode setting 225 and the exposure index setting 235. An exposure time setting 255 ($T_E$) is then determined in determine exposure time step 250 in accordance with the measured scene brightness, the capture mode setting 225, the exposure index setting 235 and the aperture setting 245. It should be noted that these steps are not necessarily performed in the order shown in FIG. 1. After the various settings have been determined, a capture digital image step 260 is used to capture and store a digital image 265.

If motion of the image capture device or the scene occurs during image capture, motion blur can result in the captured image as the magnitude of the motion increases relative to the exposure time. There are two types of motion blur: global motion blur and local motion blur. Global motion blur is produced when the image capture device is moving relative to the scene during capture, resulting in the entire image being blurred. Local motion blur is produced when the image capture device is stationary, but one or more objects in the scene are moving. In this case, only the moving object is blurred. Motion blur problems are generally more severe in low light level photography environments due to the fact that longer exposure times are typically required.

A number of methods to reduce global motion blur are known to those in the field. One method is to use an image stabilization system. Such methods typically use an inertial measurement device (e.g., a gyroscope or an accelerometer) to measure the motion of the image capture device during capture and then use a special lens with a lens element that can be moved laterally to cause the image formed by the lens on the image sensor to move in a direction that compensates for the image capture device motion. In other embodiments, the image sensor itself can be moved laterally to compensate for the image capture device motion.

A method that can be used to correct for motion during the capture of video image is described in U.S. Patent Application Publication. 2006/0274156, to Rabbani et al., entitled "Image sequence stabilization method and camera having dual path image sequence stabilization." This approach is based on a digital shifting of individual frames in a captured video sequence to compensate for movement of the digital camera. While this method cannot reduce motion blur in a single frame, it is effective to stabilize a sequence of captured video images to reduce the effect of camera shake.

None of the above-described methods are effective to reduce the effects of local motion blur. One method to reduce local motion blur is to shorten the exposure time to a setting which is shorter than the value determined by the exposure control system. The resulting images will be darker and have a lower signal-to-noise ratio. An analog or digital gain can then be applied to the pixel values in the image to brighten the darker images, but those skilled in the art will recognize that this will result in noisier images.

Another method to reduce motion blur is to gather more light by using either a lens with a larger aperture or an image sensor with larger pixels, thereby enabling the use of a shorter exposure time. This approach can produce images with reduced motion blur and acceptable noise levels. However, the current industry trend in electronic imaging systems is to make image capture devices more compact and less expensive. High-grade optical elements with large apertures and image sensors with larger pixels are substantially more expensive, and are therefore not practical for many applications.

Another method to reduce motion blur is to supplement the available light with a photographic flash in order to reduce the effective exposure time. A photographic flash produces a strong light flux that is sustained for a small fraction of a second. The actual exposure time can be set to a short value which is marginally longer than the flash duration. Generally, the flash will be the dominant light source, and therefore the flash duration will define the effective exposure time. Therefore, the motion blur caused by either global or local motion during the exposure can be significantly reduced. However, flash photography is typically only useful if the distance between the flash and the scene being photographed is relatively small. Flash photography also tends to produce artifacts such as red eyes, shadows, and very bright areas or dark areas, which many people find objectionable.

U.S. Patent Application Publication 2007/0237514 to Pillman, entitled "Varying camera self-determination based on subject motion," teaches a method for capturing digital images where motion in the scene is measured prior to image capture. The camera settings are adjusted responsive to the determined scene motion.

In U.S. Patent Application Publication 2007/0237506 to Minema et al., entitled "Image blurring reduction," a camera is described wherein an image is captured at a slower shutter speed if no camera motion is detected. If camera motion is detected, then an image is captured at a faster shutter speed. While this method does reduce motion blur in images, it does not address the combined effects of motion blur and noise in the image on the perceived image quality of the image in selecting capture conditions including exposure time and ISO.

U.S. Patent Application Publication 2009/0040364 to Rubner, entitled "Adaptive Exposure Control," teaches using a multiple image capture process to reduce image quality artifacts including motion blur. With this method, a first image is captured using exposure conditions defined by the a conventional exposure control system. The first image is then analyzed for aspects of image quality such as overexposure or underexposure, motion blur, dynamic range or depth of field to determine which aspects have been met and where deficiencies remain. If deficiencies are identified in aspects of image quality, the process determines new exposure parameters and captures an additional image. This process repeats until all the aspects of image quality have been met amongst the multiple images that have been captured. A final image is then constructed by combining portions of the multiple images. This method does not address motion related image quality issues in applications which require capturing only a single digital image.

U.S. Pat. No. 5,598,237 to McIntyre, entitled "Image capture apparatus," describes an image capture apparatus operable in a handheld condition and in a stabilized non-handheld condition. Different exposure parameters are selected depending on whether the camera is being used in the handheld condition.

U.S. Pat. No. 6,384,976 to Ishijima et al., entitled "Image stabilizing apparatus," and related U.S. Patent Application Publication 2002/0093739 to Ishijima et al., entitled "Image stabilizing apparatus," disclose an image stabilization apparatus in which a vibration reduction mode and a panning/tilting mode are selected automatically.

U.S. Pat. No. 7,164,531 to Yamamoto, entitled "Image stabilization apparatus," describes an image stabilization apparatus comprising an optical system where a portion of the optical elements are controlled to stabilize the optical image while the remaining optical elements are held in a predetermined position.

While image stabilization systems that adjust the position of optical elements or the sensor can substantially reduce the level of global motion blur in a digital image, their use has a number of disadvantages. One disadvantage is that the image stabilization system uses power and therefore drains the battery faster than non-stabilized lens systems. Another disadvantage is that the image stabilization systems have moving parts that can wear out over time, thereby decreasing the lifetime of the camera. Some cameras have a switch that can be used to turn the image stabilization system off when it is not needed, but this requires a manual user action and requires the user to understand what photography conditions would benefit from the use of the image stabilization system. It also makes it likely that the user will forget to engage the image stabilization system during some situations where it would be beneficial and will capture some images with significant image quality degradations.

There remains a need for a digital camera having reduced susceptibility to motion blur that does not have the disadvantages of cameras having image stabilization systems that are constantly operating or must be manually activated.

SUMMARY OF THE INVENTION

The present invention represents an image stabilized digital image capture device, comprising:
an image sensor for capturing a digital image;
an optical system for imaging a scene onto the image sensor;
an image stabilization system;
an exposure control system;
a memory system; and
a processor for performing the steps of:
determining exposure settings using the exposure control system;
selectively engaging the image stabilization system responsive to whether the determined exposure settings satisfy a predefined condition;
capturing a digital image of a scene using the image sensor and the selectively engaged image stabilization system; and
storing the captured digital image in the memory system.

An advantage of the present invention is that the power consumption of the digital image capture device is reduced when the image stabilization system is disengaged, thereby extending battery life and reducing wasted energy.

An additional advantage of the present invention is that mechanical wear of mechanical components in the image stabilization system is reduced when the image stabilization system is disengaged, thereby extending the useful life of the imaging system.

DETAILED DESCRIPTION OF THE INVENTION

Figure 1:
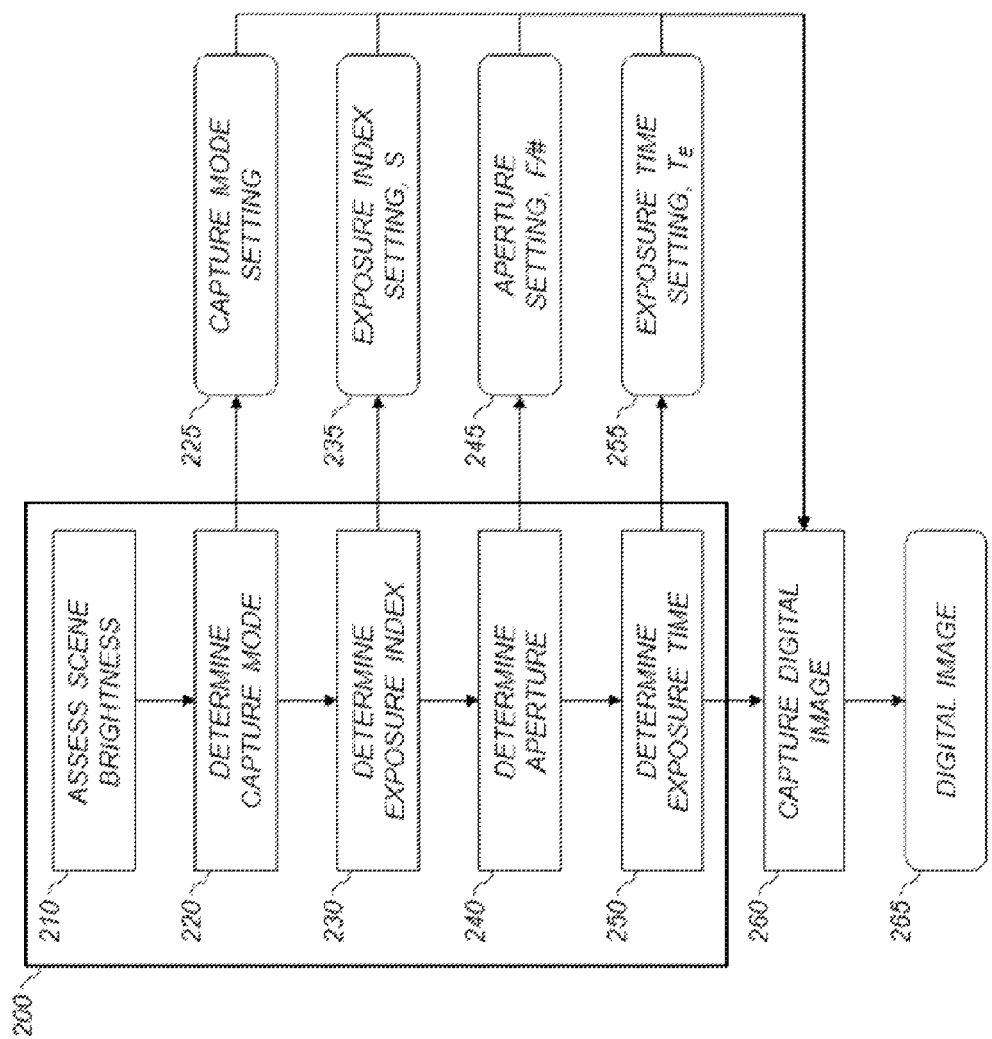
FIG. 1 is a flow chart for a prior art exposure control system.

In the following description, a preferred embodiment of the present invention will be described in terms that would ordinarily be implemented as a software program. Those skilled in the art will readily recognize that the equivalent of such software can also be constructed in firmware or hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 2:
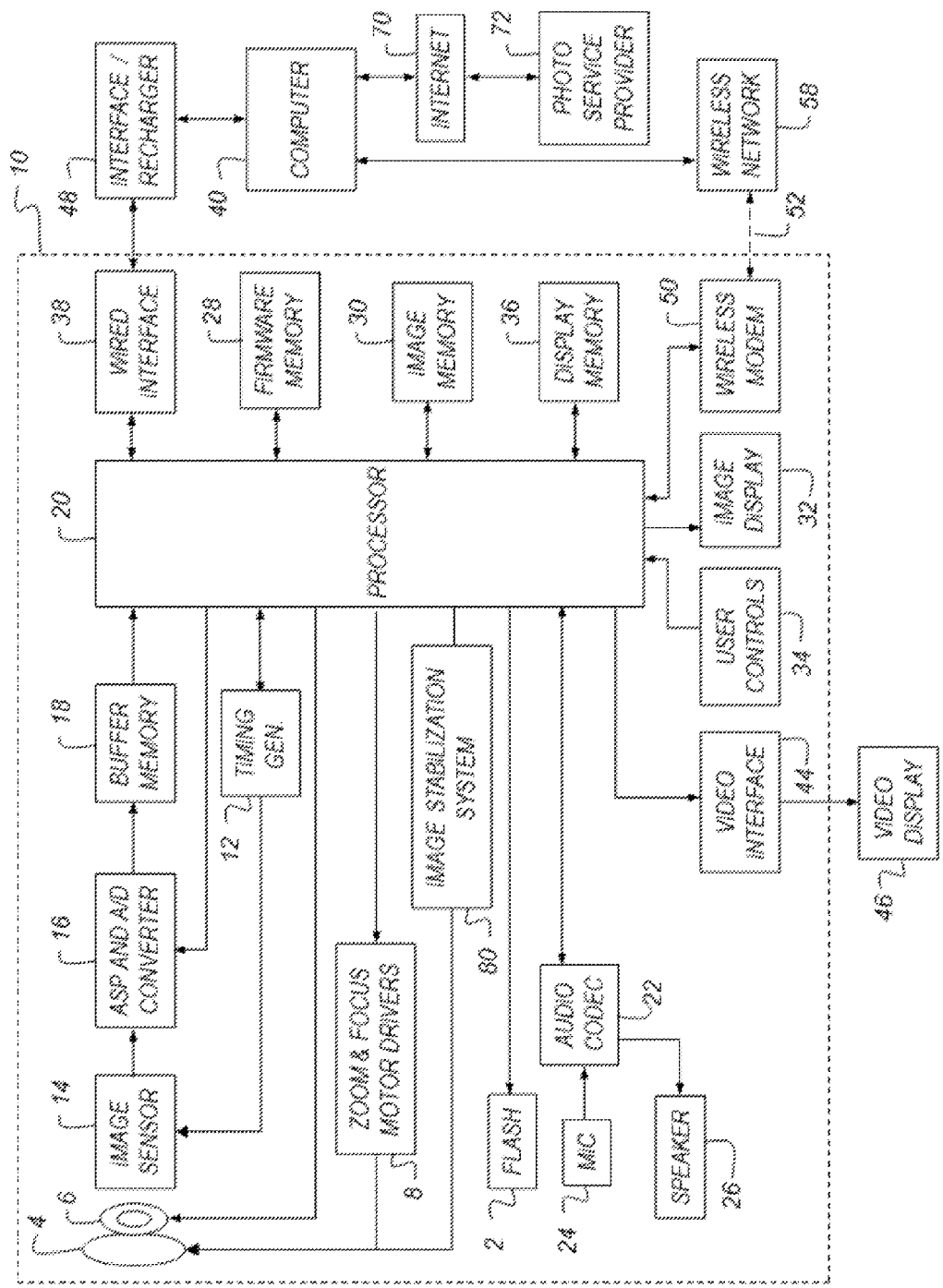
FIG. 2 is a high-level diagram showing the components of a digital camera system.

FIG. 2 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 2 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in U.S. Pat. No. 3,971,065, "Color imaging array" to Bayer, the disclosure of which is incorporated herein by reference. As a second example, the different color pixels can be arranged as described in U.S. Patent Application Publication 2005/191729, filed on Jul. 28, 2007 and titled "Image sensor with improved light sensitivity" to Compton and Hamilton, the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 2, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixel values, or by combining some color pixel values while eliminating other color pixel values. The preview mode image data can be processed as described in U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The digital camera 10 in the present invention includes an image stabilization system 80, which is used to reduce the effects of motion blur in captured digital images. In a preferred embodiment, the lens 4 includes one or more lens elements that can be moved laterally to cause the image formed by the lens 4 on the image sensor 14 to move in a direction that compensates for the motion of the digital camera 10. The image stabilization system 80 will typically include an inertial measurement device (e.g., a gyroscope or an accelerometer) to measure the motion of the digital camera 10 in order to determine the required motions of the lens elements. In some embodiments, the digital camera 10 can include inertial measurement devices that are used for other purposes. In this case the image stabilization system 80 can use the signals from those inertial measurement devices rather than duplicating those components. It some embodiments, the image stabilization system 80 can move the image sensor 14 to compensate for the motion of the digital camera 10, rather than moving one or more of the lens elements.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multifunction device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 3:
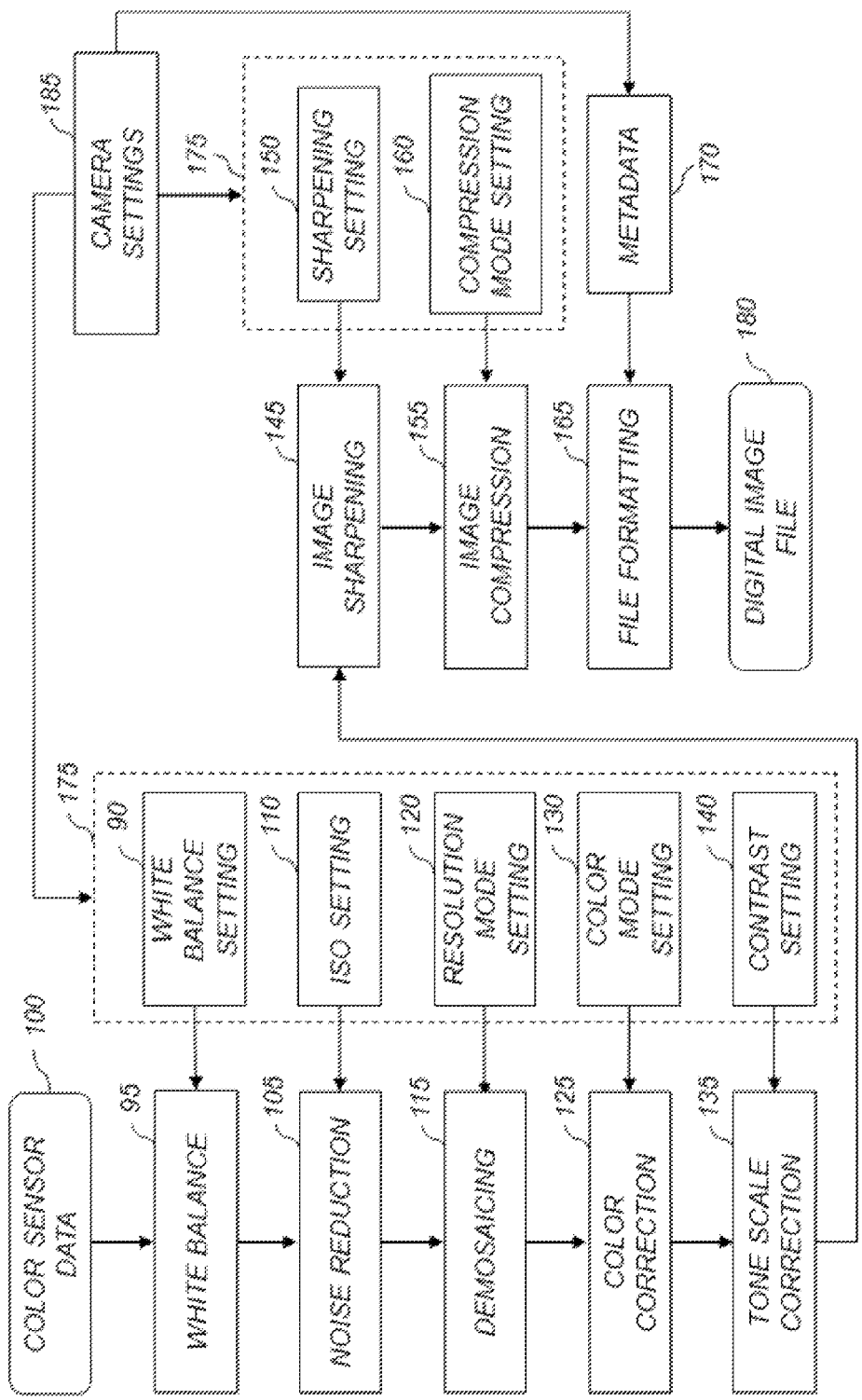
FIG. 3 is a flow diagram depicting typical image processing operations used to process digital images in a digital camera.

FIG. 3 is a flow diagram depicting image processing operations that can be performed by the processor 20 in the digital camera 10 (FIG. 2) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500× 1000 pixels) or small size (750×500 pixels).

The color image data is color corrected in color correction step 125. In some embodiments, the color correction is provided using a 3×3 linear space color correction matrix, as described in U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

Figure 4:
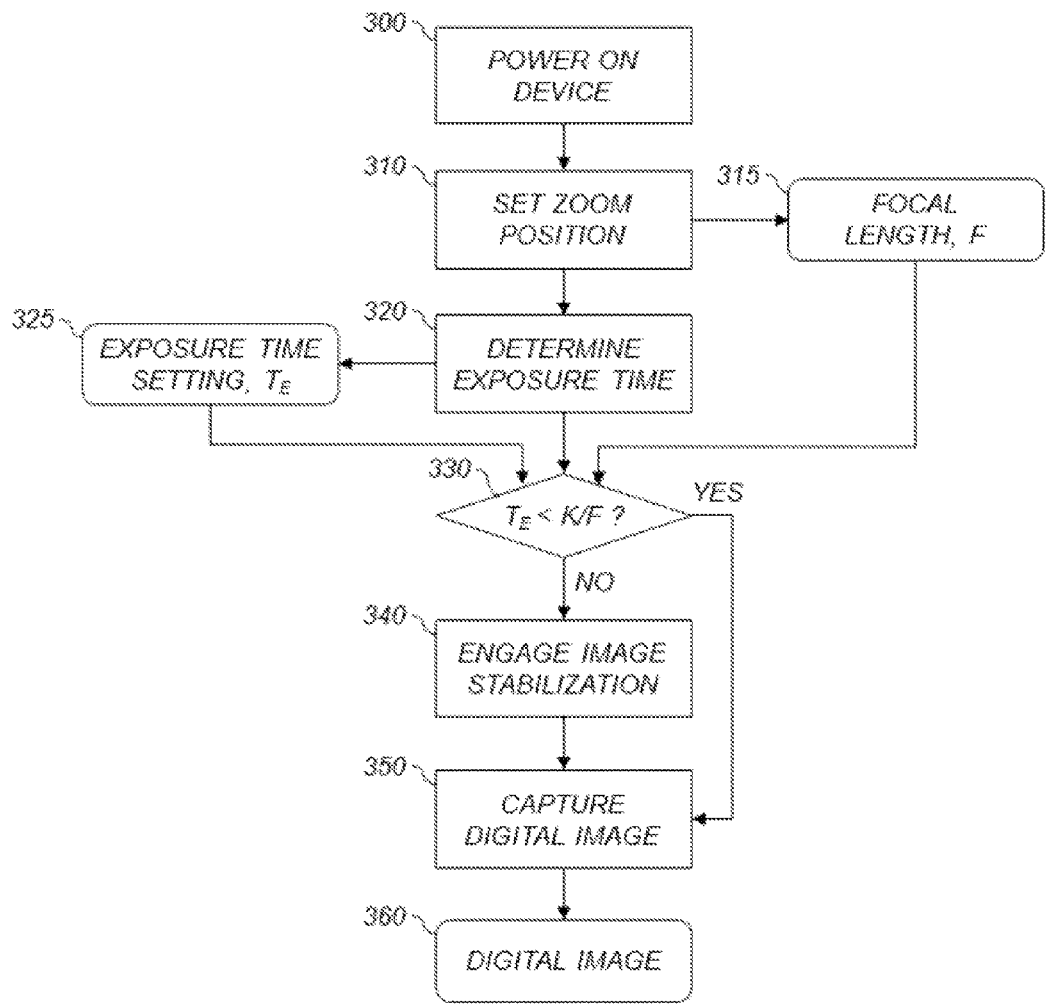
FIG. 4 is a flowchart illustrating a method for controlling an image stabilized digital image capture device according to an embodiment of the present invention.

The present invention will now be described with reference to FIG. 4, which is a flowchart of illustrating a method for an image stabilized digital image capture device according to an embodiment of the present invention. First a power on device step 300, powers on the digital image capture device. In a preferred embodiment, the digital image capture device is a digital camera 10 as described with reference to FIGS. 2 and 3. The digital camera 10 can be a digital still camera or a digital video camera, for example. In the FIG. 4 embodiment, it will be assumed that the digital image capture device include a zoom lens, although this is not a requirement.

A set zoom position step 310 is used to set a focal length 315 (F) for the lens 4 (FIG. 2). Generally, the set zoom position step 310 will involve a user adjusting various user interface controls on the digital image capture device. Any method known in the art for adjusting the focal length of a lens 4 can be used in accordance with the present invention. For example, some digital image capture devices include "zoom in" and "zoom out" buttons which are used to control the focal length of the lens 4. Other digital image capture device configurations include a lens 4 where the focal length can be adjusted by grasping a ring on the exterior of the lens barrel and twisting in a clockwise or counter-clockwise direction to adjust the focal length. The selected focal length 315 can be automatically reported to the processor 20 (FIG. 2) in the digital image capture device so that it can be used in the process of determining whether or not to engage the image stabilization system 80 (FIG. 2) as will be described below. Methods for determining a digital representation of the selected focal length 315 of a zoom lens are well-known in the art.

Next, a determine exposure time step 320 is used to determine an exposure time setting 325 ($T_E$). In a preferred embodiment, the determine exposure time step 320 is included as part of an exposure control system, such as the prior art exposure control system 200 described with reference to FIG. 1. In general, the exposure control system will also determine other exposure settings such as a capture mode setting, an exposure index setting, a lens aperture setting or a flash setting. Typically, the process of determining the exposure settings will be initiated by a user action such as initiating an image capture or by pressing an image capture button down halfway.

An exposure time test 330 is used to evaluate the exposure time 325 to determine whether the image stabilization system 80 should be engaged. In the embodiment shown in FIG. 4, the exposure time test 330 involves a comparison of the calculated exposure time setting 325 with a threshold exposure time computed from the focal length 315. If the exposure time is greater than the threshold exposure time then the image stabilization system 70 is engaged, otherwise it is not engaged. In the FIG. 4 embodiment, the threshold exposure time, $T_t$ is given by $$T_t = K/F \quad (5)$$

where K is a predefined constant. A reasonable value of the constant that can be used in many cases is K=1.0, although those skilled in the art will recognize that other values may be appropriate depending on the application. In other embodiments, the threshold exposure time $T_t$ can be a fixed constant, or can be calculated using other appropriate relationships If the exposure time test 330 determines that the exposure time setting 325 is greater than the threshold exposure time, $T_t$, then an engage image stabilization step 340 is called to engage the image stabilization system 80 (FIG. 2) before a capture digital image step 350 is used to capture a digital image 360. Otherwise, the image stabilization system 80 is left in a disengaged state and execution proceeds directly to the capture digital image step 350.

In some embodiments, the decision of whether to engage the image stabilization system 80 is initiated when the user presses an image capture button down halfway. The capture digital image step 350 is then initiated with the user fully depresses the image capture button. In other embodiments, the process of deciding whether to engage the image stabilization system 80 is not tied to the image capture button, but occurs automatically anytime the exposure control system 200 determines new exposure settings.

In some embodiments, the decision to engage the image stabilization system 80 can be based on other exposure settings in addition to, or instead of, the exposure time setting 325. Examples of other exposure settings that could be used would include the capture mode setting, the exposure index setting, the lens aperture setting or the flash setting. Some of these exposure settings may be determined automatically using the exposure control system, while others may be fixed, or may be manually user selected using a user interface control. For example, many digital image capture devices allow a user to manually select a capture mode such as "sports, "portrait," or "landscape." One or more predefined conditions can be defined which can be evaluated to determine whether the image stabilization system should be engaged. For example, a condition could be defined according to the following logic:

if (Flash =" ON")                                         (6)
    Disengage Image Stabilization
else if ((CaptureMode =" SPORTS") AND ($T_E$ > 0.5/F))
    Engage Image Stabilization
else if ($T_E$ > 1/F)
    Engage Image Stabilization
else
    Disengage Image Stabilization With this condition, the image stabilization system is never engaged if the electronic flash is used. Furthermore a different exposure time test is used depending on whether the capture mode is set to a "sports" mode. In the sports mode, the image stabilization system is engaged at a shorter exposure time than for other capture modes.

In some embodiments, the decision to engage the image stabilization system 80 can also be based on other factors in addition to (or instead of) the exposure settings. For example, the motion of the digital image capture device can be evaluated by analyzing the signal from an accelerometer or a gyroscope. If it is determined that the digital image capture device is relatively still (e.g., if it is mounted on a tripod), then a different criteria can be applied to determine whether to engage the image stabilization system than is applied when the motion of the digital image capture device exceeds some threshold.

In some embodiments, a time sequence of preview images of the scene can be captured in a preview mode and can be analyzed to detect motion in the scene. Any method known in the art can be used to detect motion in the scene. An example of a method for detecting motion in a scene by analyzing a time sequence of preview images is taught in U.S. patent application Ser. No. 12/701,659 to Pillman et al., entitled "Capture condition selection from brightness and motion." which is incorporated herein by reference. This method involves analyzing differences between the captured preview images to detect motion in the scene. The image stabilization system 80 can then be selectively engaged responsive to the detected motion characteristics. For example, if motion is detected that exceeds a predefined threshold, then the image stabilization system 80 can be engaged, otherwise it can remain in an unengaged state. The detected motion can be global motion corresponding to a motion of the digital image capture device, or it can be local motion corresponding to motion of an important object in the scene.

The principles described herein with respect to the use of image stabilization systems with digital image capture devices can also be applied to other types of imaging systems such as binoculars and telescopes which produce images intended for observation by a human observer rather than for the purpose of capturing a digital image. Many such imaging systems have a zoom capability provided by variable focal length optics. The use of image stabilization systems in such imaging systems are well-known in the art. However, the image stabilization systems are manually activated, typically using some sort of power switch. The advantages provided by the use of image stabilization systems are most significant when the imaging systems are being used at magnification levels where small variations in the orientation of the imaging system can produce large changes in the viewed image.

When an imaging system having a zoom capability is used at low-magnification levels, engaging the image stabilization system provides very little value, but continues to consume power. Additionally, various mechanical components of the image stabilization system continue to experience unnecessary wear. However, in conventional imaging systems the user must decide when it is appropriate to engage the image stabilization system. Often the user will forget to engage the image stabilization system when it would be beneficial to do so, or will forget to disengage the image stabilization system when it is not providing any significant benefit.

Figure 5:
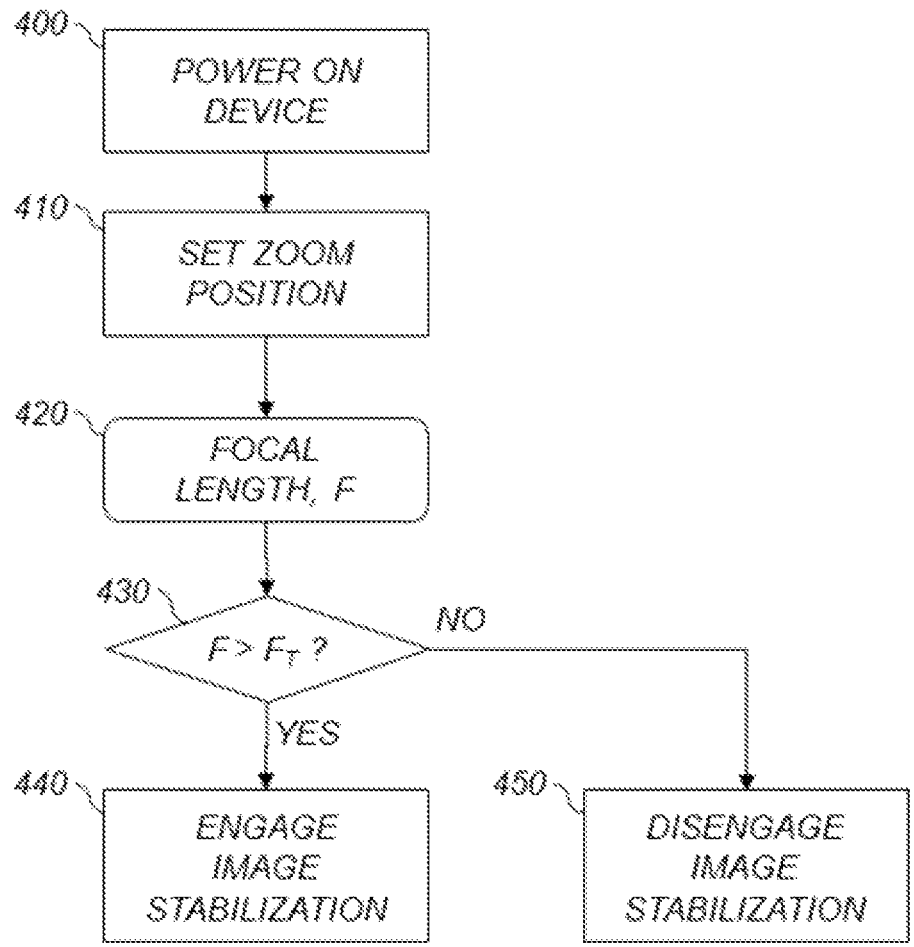
FIG. 5 is a flowchart illustrating a method for controlling an image stabilized imaging according to an alternate embodiment of the present invention.

FIG. 5 shows an embodiment of the present invention where an image stabilization system in an imaging system is selectively engaged responsive to adjustable optical system settings. In particular, the image stabilization system can be selectively engaged responsive to a magnification setting for the imaging system. Typically, the magnification setting is controlled by a user-selectable variable focal length setting for the imaging system. In one embodiment, the image stabilization system is selectively engaged responsive to the selected focal length. If the selected focal length is larger than a prespecified threshold focal length, the image stabilization system is automatically engaged. Otherwise, the image stabilization system is automatically disengaged, thus providing the benefits of reduced power consumption and reduced mechanical component wear.

According to the flow chart of FIG. 5, a power on device step 400, powers on the imaging device. In one embodiment, the imaging device is a set of binoculars having a zoom capability. In other embodiments, the imaging device can be a telescope, or some other type of imaging device for forming an optical imaging having a variable magnification capability.

A set zoom position step 410 is used to set a focal length 420 (F) for the imaging system. Generally, the set zoom position step 410 will involve a user adjusting a zoom position control on the imaging system. Any method known in the art for adjusting the zoom position can be used in accordance with the present invention. For example, the zoom position for some imaging systems can be adjusted by grasping a ring on the exterior of the lens barrel and twisting in a clockwise or counter-clockwise direction to adjust the focal length. In other configurations, an adjustment wheel or lever can be provided to adjust the focal length. Other types of imaging systems include electronic controls for adjusting the magnification. For example, "zoom in" and "zoom out" buttons can be provided to control the focal length of the imaging system.

The selected focal length 420 can be automatically reported to a processor in the imaging device for use in the process of determining whether or not to engage the image stabilization system. Methods for determining a digital representation of the selected focal length 420 of a zoom lens are well-known in the art.

A focal length test 430 is used to compare the selected focal length 420 to a threshold focal length, $F_T$. If the focal length 420 is greater than the threshold focal length, then an engage image stabilization step 440 is executed to automatically engage the image stabilization system. Otherwise, a disengage image stabilization step 450 is executed to automatically disengage the image stabilization system.

In some embodiments, the selective engagement of the image stabilization system is also responsive to a sensed light level. This enables the image stabilization system to be automatically disengaged when the imaging system is not being used (e.g., if the user has placed lens caps on the optical components or if the imaging system is stored in a case). In this configuration, if the user forgets to power off the device, then the image stabilization system will not continue to be drain power from the battery. In this case, the engage image stabilization step 440 will only be executed if the focal length test 430 indicates that the focal length 420 is greater than the threshold focal length and the sensed light level is simultaneously determined to be larger than a threshold light level. In addition to disengaging the image stabilization system when the imaging system is not being used. The imaging system can be automatically fully powered down if it remains in this state for more than a predetermined length of time.

In some embodiments, the imaging system further includes a means for detecting motion in the scene, and the selective engagement of the image stabilization system is also responsive to the detected motion in the scene. In this configuration the image stabilization system can be disengaged when no scene motion is detected, even if the imaging system is being used at a high imagination level. For example, if the imaging system is being used in a tripod mounted configuration, the image of the scene may be very stable so that no motion will be detected. As a result, there would be no need to engage the image stabilization system. The same means for detecting motion in the scene described above with respect to the digital camera configuration can be used in used to detect the scene motion in this case. For example, an image sensor can be used to capture a time sequence of images and the captured images can be analyzed to detect motion of the image scene.

In some embodiments, the imaging system further includes a means for detecting motion of the imaging device, and the selective engagement of the image stabilization system is also responsive to the detected motion of the imaging device. In this configuration the image stabilization system can be disengaged when the imaging device is stationary, even if the imaging system is being used at a high imagination level. For example, if the imaging system is being used in a tripod mounted configuration, there may be no need to engage the image stabilization system. Any means for detecting motion of the imaging device known in the art can be used for this purpose. For example, an inertial measurement device including a gyroscope or an accelerometer can be used to detect any motion of the image capture device.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
44 video interface
46 video display
48 interface/recharger
50 wireless modem
52 radio frequency band
58 wireless network
70 Internet
72 photo service provider
80 image stabilization system
90 white balance setting
95 white balance step
100 color sensor data
105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step 160 compression mode setting
165 file formatting step
170 metadata
175 photography mode settings
180 digital image file
185 camera settings
200 exposure control system
210 assess scene brightness step
220 determine capture mode step
225 capture mode setting
230 determine exposure index step
235 exposure index setting
240 determine aperture step
245 aperture setting
250 determine exposure time step
255 exposure time setting
260 capture digital image step
265 digital image
300 power on device step
310 set zoom position step
315 focal length setting
320 determine exposure time step
325 exposure time setting
330 exposure time test
340 engage image stabilization step
350 capture digital image step
360 digital image
400 power on device step
410 set zoom position step
420 focal length setting
430 focal length test
440 engage image stabilization step
450 disengage image stabilization step

The invention claimed is:

1. An image stabilized digital image capture device, comprising:
    an image sensor for capturing a digital image;
    an optical system for imaging a scene onto the image sensor;
    an image stabilization system;
    an exposure control system;
    a memory system; and
    a processor for performing the steps of:
        determining exposure settings using the exposure control system;
        capturing a time sequence of preview images using the image sensor;
        detecting motion in the imaged scene by analyzing differences between the captured preview images;
        selectively engaging, prior to capturing a digital image, the image stabilization system responsive to the detected motion and responsive to whether the determined exposure settings satisfy a predefined condition;
        capturing a digital image of a scene using the image sensor and the selectively engaged image stabilization system; and
        storing the captured digital image in the memory system.

2. The image stabilized digital image capture device of claim 1, wherein the image stabilization system dynamically moves one or more elements of the optical system.

3. The image stabilized digital image capture device of claim 1, wherein the image stabilization system dynamically moves the image sensor.

4. The image stabilized digital image capture device of claim 3, wherein the image stabilization system dynamically moves the image sensor to compensate for a sensed motion of the digital image capture device.

5. The image stabilized digital image capture device of claim 4, wherein the moving of the image sensor provides a stabilized image of the scene on the image sensor.

6. The image stabilized digital image capture device of claim 2, wherein the image stabilization system dynamically moves the one or more elements of the optical system to compensate for a sensed motion of the digital image capture device.

7. The image stabilized digital image capture device of claim 6, wherein the moving of the one or more elements of the optical system provides a stabilized image of the scene on the image sensor.

8. The image stabilized digital image capture device of claim 1, wherein power consumption of the digital image capture device and mechanical wear of the image stabilization system are reduced when the image stabilization system is disengaged.

9. The image stabilized digital image capture device of claim 1, wherein the image stabilization system is not engaged when an exposure time of the image sensor is less than a threshold exposure time, $T_t$, given by $T_t = K/F$, where F is a focal length of the optical system and K is a predefined constant.

10. The image stabilized digital image capture device of claim 9, wherein different values of predefined constant K are used responsive to a capture mode setting.

11. The image stabilized digital image capture device of claim 1, further including an electronic flash, wherein the determined exposure settings include an indication of whether the electronic flash is to be fired, and wherein the image stabilization system is not engaged when the electronic flash is to be fired.

12. The image stabilized digital image capture device of claim 1, wherein the image stabilized digital image capture device is a digital still camera or a digital video camera.

13. The image stabilized digital image capture device of claim 1, wherein the behavior of the image stabilization system is controlled responsive to one or more parameters, wherein at least one of the one or more parameters is adjusted responsive to the determined exposure settings.

14. A non-transitory program storage device, readable by a programmable control device comprising instructions stored thereon for causing the programmable control device to:
    obtain exposure settings from an exposure control system of a digital image capture device;
    obtain a time sequence of preview images captured using an image sensor of the digital image capture device;
    detect motion in the time sequence of preview images by analyzing differences between the captured preview images;
    selectively engage, prior to capture of a digital image, an image stabilization system of the digital image capture device responsive to the detected motion and responsive to whether the obtained exposure settings satisfy a predefined condition;
    cause the digital image capture device to capture a digital image of a scene using the selectively engaged image stabilization system; and
    store the captured digital image in a memory.

15. The non-transitory program storage device of claim 14, wherein the image stabilization system dynamically moves one or more elements of an optical system of the digital image capture device.

16. The non-transitory program storage device of claim 15, wherein the image stabilization system dynamically moves the one or more elements of the optical system to compensate for a sensed motion of the digital image capture device.

17. The non-transitory program storage device of claim 16, wherein the moving of the one or more elements of the optical system provides a stabilized image of the scene on the image sensor.

18. The non-transitory program storage device of claim 14, wherein the image stabilization system is not engaged when an exposure time of the image sensor is less than a threshold exposure time, $T_t$, given by $T_t = K/F$, where F is a focal length of the digital image capture device and K is a predefined constant.

19. The non-transitory program storage device of claim 18, wherein different values of predefined constant K are used responsive to a capture mode setting of the digital image capture device.

20. The non-transitory program storage device of claim 14, wherein behavior of the image stabilization system is controlled responsive to one or more parameters, and wherein at least one of the one or more parameters is adjusted responsive to the obtained exposure settings.

\* \* \* \* \*

UNITED STATES PATENT AND TRADEMARK OFFICE
CERTIFICATE OF CORRECTION

| | | |
|---|---|---|
| PATENT NO. | : 8,970,713 B2 | Page 1 of 1 |
| APPLICATION NO. | : 14/147961 | |
| DATED | : March 3, 2015 | |
| INVENTOR(S) | : Noah J. Stupak et al. | |

It is certified that error appears in the above-identified patent and that said Letters Patent is hereby corrected as shown below:

On the Title page, Item 72, replace "Keith S. Kam" with --Keith S. Karn--.

Signed and Sealed this
Sixteenth Day of June, 2015

Michelle K. Lee
*Director of the United States Patent and Trademark Office*